(12) United States Patent
Pei

(10) Patent No.: US 10,969,056 B2
(45) Date of Patent: Apr. 6, 2021

(54) ADJUSTABLE MOUNTING BRACKET

(71) Applicant: Xubo Pei, Shenzhen (CN)

(72) Inventor: Xubo Pei, Shenzhen (CN)

( * ) Notice: Subject to any disclaimer, the term of this patent is extended or adjusted under 35 U.S.C. 154(b) by 0 days.

(21) Appl. No.: 16/446,829

(22) Filed: Jun. 20, 2019

(65) Prior Publication Data

US 2020/0340614 A1 Oct. 29, 2020

(30) Foreign Application Priority Data

Apr. 25, 2019 (CN) .......................... 201920599594.0

(51) Int. Cl.
*F16M 11/20* (2006.01)
*F16M 11/04* (2006.01)

(52) U.S. Cl.
CPC ......... *F16M 11/2092* (2013.01); *F16M 11/04* (2013.01); *F16M 11/2085* (2013.01)

(58) Field of Classification Search
CPC .... F16M 11/2085; F16M 11/04; F16M 11/20; F16M 11/2092; Y10S 248/917; Y10S 248/919; Y10S 248/92; Y10S 248/921; Y10S 248/922; Y10S 248/923; Y10S 248/924
USPC ....... 248/917, 919, 920, 921, 922, 923, 924; D14/451, 452
See application file for complete search history.

(56) References Cited

U.S. PATENT DOCUMENTS

| | | | | |
|---|---|---|---|---|
| 1,951,583 A | * | 3/1934 | Swanson | A47G 1/24 248/477 |
| 3,838,842 A | * | 10/1974 | McCracken | A47G 1/1613 248/476 |
| 7,077,373 B1 | * | 7/2006 | Hoebener | F16M 11/10 248/278.1 |
| 7,537,189 B2 | * | 5/2009 | Jung | F16M 11/10 248/281.11 |
| 7,963,489 B2 | * | 6/2011 | O'Keene | F16M 11/10 248/201 |
| 8,245,992 B2 | * | 8/2012 | Matsui | F16M 13/02 248/224.51 |
| 8,891,249 B2 | * | 11/2014 | Stanek | F16M 13/02 361/810 |
| 9,121,543 B2 | * | 9/2015 | Dittmer | F16M 11/2092 |
| 9,822,925 B2 | * | 11/2017 | Helmikkala | F16M 11/045 |

(Continued)

*Primary Examiner* — Jonathan Liu
*Assistant Examiner* — Guang H Guan
(74) *Attorney, Agent, or Firm* — Maier & Maier, PLLC

(57) ABSTRACT

An adjustable mounting bracket, which is applied for mounting a display device, is provided by the present disclosure. The adjustable mounting bracket includes a wall panel, a plurality of extending rods, and a limiting structure. The plurality of extending rods are detachably coupled to the wall panel and configured to adjusted length of the mounting bracket. The limiting structure is arranged on the wall panel. A receiving space is formed by the limiting structure and the wall panel. The plurality of extending rods are engaged with the limiting structure and received in the receiving space. The limiting structure is configured to guide the plurality of extending rods to slide in the receiving space. The adjustable mounting bracket provided by the present disclosure can be easily assembled, meet the requirements of installation specifications and packaging specifications, and be suitable for promotion and application.

18 Claims, 3 Drawing Sheets

(56) References Cited

U.S. PATENT DOCUMENTS

| | | | | |
|---|---|---|---|---|
| D848,989 S * | 5/2019 | Pei | ........................ | A47B 97/001 |
| | | | | D14/239 |
| 10,563,811 B2 * | 2/2020 | Pei | ...................... | F16M 11/2092 |
| 2019/0053620 A1 * | 2/2019 | Brandt | .................. | A47B 97/001 |
| 2020/0120305 A1 * | 4/2020 | Pei | ........................ | A47B 97/001 |
| 2020/0340614 A1 * | 10/2020 | Pei | ......................... | F16M 11/04 |

\* cited by examiner

ADJUSTABLE MOUNTING BRACKET

CROSS-REFERENCE TO RELATED APPLICATIONS

The present patent application claims benefit and priority to Chinese Patent Application No. 2019205995940 filed on Apr. 25, 2019 which is hereby incorporated by reference into the present disclosure.

TECHNICAL FIELD

The present disclosure relates to the technical field of displays, more particularly to an adjustable mounting bracket.

BACKGROUND

With the development of display technology, display devices have the advantages of small footprint and light weight, which are widely applied in homes, shopping malls, or offices. The display devices are generally supported by mounting brackets, thus realizing quick installation and easy disassembly of a display. However, sizes of the display devices generally correspond to sizes of the mounting brackets. When a new display device needs to be replaced, a new mounting bracket also needs to be replaced, thus it is troublesome to assemble. In addition, the existing mounting brackets cannot meet the requirements of installation specifications and packaging specifications at the same time, thus restricting their promotion and application.

SUMMARY

In view of this, in order to solve the above problems, an embodiment of the utility model provides an adjustable mounting bracket.

An adjustable mounting bracket, which is applied for mounting a display device, is provided by the present disclosure. The adjustable mounting bracket includes a wall panel, a plurality of extending rods, and a limiting structure. The plurality of extending rods are detachably coupled to the wall panel and configured to adjusted length of the mounting bracket. The limiting structure is arranged on the wall panel. A receiving space is formed by the limiting structure and the wall panel. The plurality of extending rods are engaged with the limiting structure and received in the receiving space. The limiting structure is configured to guide the plurality of extending rods to slide in the receiving space.

Compared with the related art, an adjustable mounting bracket, which is applied for mounting a display device, is provided by the present disclosure. The adjustable mounting bracket includes a wall panel, a plurality of extending rods, and a limiting structure. The plurality of extending rods are detachably coupled to the wall panel and configured to adjusted length of the mounting bracket. The limiting structure is arranged on the wall panel. A receiving space is formed by the limiting structure and the wall panel. The plurality of extending rods are engaged with the limiting structure and received in the receiving space. The limiting structure is configured to guide the plurality of extending rods to slide in the receiving space. Since the plurality of extending rods are detachably coupled to the wall panel, the length of the mounting bracket can be adjusted by disassembling or assembling the plurality of extending rods, and the requirements of installation specifications and packaging specifications can be met simultaneously and suitable for promotion and application. In addition, since the plurality of extending rods are engaged with the limiting structure and received in the receiving space, and the limiting structure is configured to guide the plurality of extending rods to slide in the receiving space, it is easy to assemble.

BRIEF DESCRIPTION OF THE DRAWINGS

In order to more clearly illustrate the embodiments of the present disclosure or the technical solutions in the related art, the drawings to be used in the embodiments or the description of the related art will be briefly described below. Obviously, the accompanying drawings in the following description are only some embodiments of the present disclosure, those skilled in the art can also obtain other drawings pedestal on these drawings without paying any creative work.

DETAILED DESCRIPTION

Figure 1:
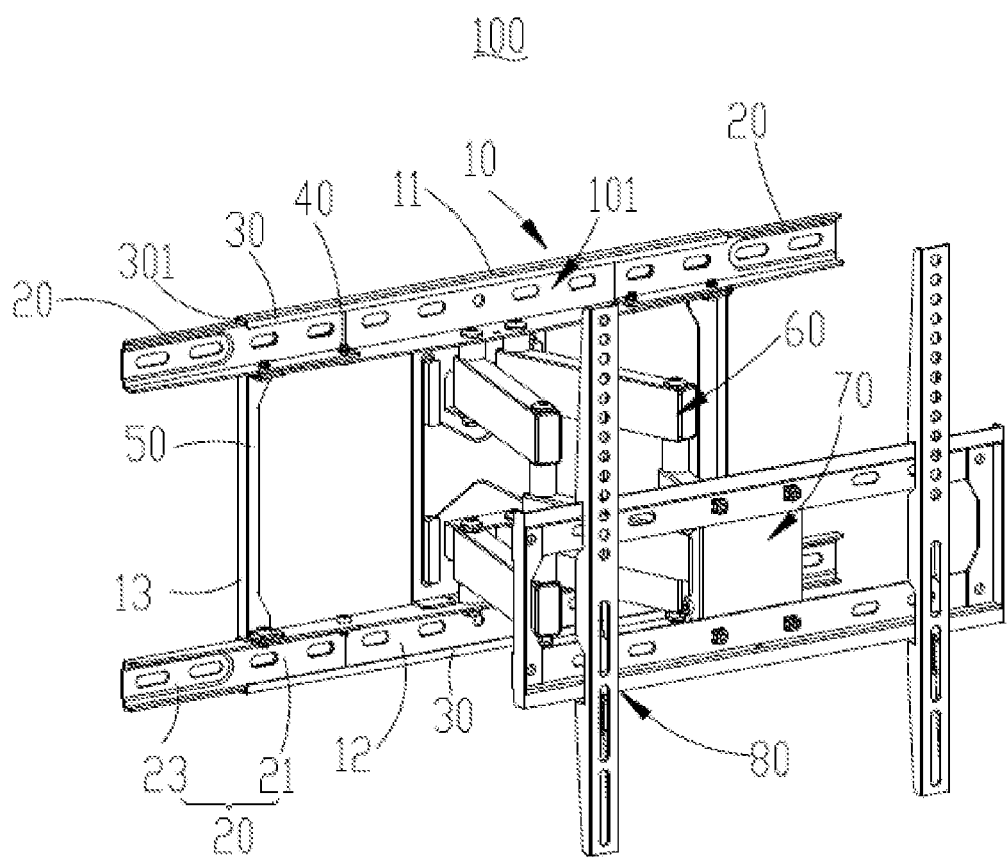
FIG. 1 is a schematic structural view of an adjustable mounting bracket provided by an exemplary embodiment of the present disclosure.

The technical solutions in the embodiments of the present disclosure will be clearly and completely described in the following with reference to the accompanying drawings in the embodiments.

It will be appreciated that, the terms used herein are for the purpose of describing particular embodiments, and are not intended to limit the present disclosure. As used herein, the singular forms "a" and "the" are intended to include the plural forms as well, unless the context clearly states otherwise. Furthermore, when the terms are used in the specification, the terms "comprises" and/or "comprising," when used in this specification, specify the presence of stated features, products, steps, operations, elements, and/or components, but do not preclude the presence or addition of one or more other features, products, steps, operations, elements, components, and/or groups thereof. The descriptions of the present disclosure are intended to be illustrative of the preferred embodiments of the present disclosure, and are not intended to limit the scope of the present disclosure. The scope of protection of the present disclosure is subject to the definition of the appended claims.

It can be understood that, a display device involved in various embodiments of the present disclosure may include various displays or televisions having display functions. The displays may be, but not limited to, a liquid crystal display, a light emitting diode (LED) display, a cathode ray tube (CRT) display, or a 3D display. For convenience of description, the devices mentioned above are collectively referred to as display devices.

At present, when the display device needs to be installed, a mounting bracket with a suitable installation specification is selected. The suitable installation specification described herein is that of a size of the mounting bracket fitted to a size of a wall panel and sufficient weight of mounting bracket for supporting the display device. However, the size of the mounting bracket currently on the market is usually larger than 24 inches, and e-commerce companies (such as Amazon) require that packaging specifications of the products need to be less than 16 inches. Such that the existing large-sized mounting brackets fail to satisfy the installation specification and the packaging specifications the display devices simultaneously, it may be inconvenient to use and restrict their promotion and application. An adjustable mounting bracket, which is applied for mounting a display device, is provided by the present disclosure. The adjustable mounting bracket includes a wall panel, a plurality of extending rods, and a limiting structure. The plurality of extending rods are detachably coupled to the wall panel and configured to adjusted length of the mounting bracket. The limiting structure is arranged on the wall panel. A receiving space is formed by the limiting structure and the wall panel. The plurality of extending rods are engaged with the limiting structure and received in the receiving space. The limiting structure is configured to guide the plurality of extending rods to slide in the receiving space. Since the plurality of extending rods are detachably coupled to the wall panel, the length of the mounting bracket can be adjusted by disassembling or assembling the plurality of extending rods, and the requirements of installation specifications and packaging specifications can be met simultaneously and suitable for promotion and application. In addition, since the wall panel arranges the limiting structure, it is easy to assemble.

As illustrated in FIG. 1, FIG. 1 is a schematic structural view of an adjustable mounting bracket 100 provided by an exemplary embodiment of the present disclosure. The adjustable mounting bracket 100 is applied for mounting the display device. The adjustable mounting bracket 100 includes a wall panel 10; a plurality of extending rods 20, a limiting structure 30, and a mounting structure 40. The limiting structure 30 is arranged on the wall panel 10. A receiving space 101 is formed by the limiting structure 30 and the wall panel 10. The plurality of extending rods 20 are detachably coupled to the wall panel 10 by the mounting structure 40. The plurality of extending rods 20 are engaged with the limiting structure 30 and received in the receiving space 101. The plurality of extending rods 20 are configured to adjust a length of the mounting bracket 100. The limiting structure is arranged on the wall panel. The limiting structure 30 is configured to guide the plurality of extending rods 20 to slide in the receiving space 101.

The receiving space 101 is configured as a guiding slot 300 formed by the limiting structure 30 and the wall panel 10. The limiting structure 30 is configured to guide the plurality of extending rods 20 to slide along an extending direction of the guiding slot 300.

In this embodiment, the wall panel 10 includes a first fixing rod 11, a second fixing rod 12 opposite to the first fixing rod 11, two third fixing rods 13 fixed on both ends of the first fixing rod 11 and the second fixing rod 12, and a connecting plate member 14 fixedly connected to middle portions of the first fixing rod 11 and the second fixing rod 12. An extending direction of the first fixing rod 11 is the same as an extending direction of the second fixing rod 12. The first fixing rod 11, the second fixing rod 12 and the two third fixing rods 13 constitute the wall panel 10 in the form of a rectangular frame. The connecting plate member 14 is configured for bearing load-bearing stresses of the first fixing rod 11 and the second fixing rod 12. The first fixing rod 11, the second fixing rod 12 and the connecting plate 14 are all fixed on the wall surface, thereby increasing the stability of the wall panel 10 and the wall surface. Alternatively, the whole wall panel 10 can be made by pulse welding, thereby reducing manpower and material resources while ensuring strength. The connecting plate member 14 is provided with two first bending pieces (not shown) adjacent to an edge of the first fixing rod 11. The two first bending pieces are welded to the first fixing rod 11. The connecting plate member 14 is provided with two second bending pieces 15 adjacent to the edge of the second fixing rod 12. The two second bending pieces 15 are welded to the second fixing rod 12 to further enhance the structural stability between the connecting plate member 14 and the first fixing rod 11 and the second fixing rod 12.

Specifically, the first fixing rod 11 and the second fixing rod 12 are in a bar shape. A first groove structure 111 and a second groove structure 121 are formed on the first fixing rod 11 and the second fixing rod 12 correspondingly. The plurality of extending rods 20 are correspondingly received in the corresponding first groove structure 111 and the second groove structure 121. The first groove structure 111 and the second groove structure 121 are both substantially U-shaped.

In this embodiment, number of the extending rods 20 is four. Four extending rods 20 are located in four corners of the wall panel 10. Specifically, the four extending rods 20 are correspondingly located on left and right sides and upper and lower sides of the wall panel 10. It can be understood that, the number of the extending rods 20 can be designed according to the size of the display device, which is not limited herein. For example, the number of the extending rods 20 may be two or more.

Alternatively, the extending rods 20 are symmetrically distributed from the connecting plate member 14. Such that the display device is balanced after being mounted on the mounting bracket 100, and thus ensuring a stability of the mounting bracket 100 mounting the display device. Specifically, the wall panel 10 has a horizontal center line X and a vertical center line Y perpendicular to the horizontal center line X. In this embodiment, the plurality of extending rods 20 are symmetrically distributed from the horizontal center line X and the vertical center line Y of the wall panel 10. In other embodiments, the plurality of extending rods 20 are symmetrically distributed from the horizontal center line X of the wall panel 10, or the plurality of extending rods 20 are symmetrically distributed from the vertical center line Y of the wall panel 10.

In this embodiment, each of the extending rods 20 is in a bar shape. Each of the extending rods 20 defines a third groove structure 201. Each of the extending rods 20 includes a connecting portion 21 and a stopping portion 23 coupled to the connecting portion 21. The connecting portion 21 is engaged with the corresponding first fixing rod 11 and the second fixing rod 12. Side surfaces of the connecting portion 21 and the stopping portion 23 adjacent to the wall panel 10 are located on different planes. Specifically, side surfaces of the connecting portion 21 and the stopping portion 23 adjacent to the wall panel 10 form a stopping structure 25. The stopping portion 23 protrudes from the connecting portion 21. The stopping portion 23 can be stopped by each of corresponding ends of the first fixing rod 11 and the second fixing rod 12 to restrict the stopping portion 23 from being exposed to each of corresponding outer sides of the first fixing rod 11 and the second fixing rod 12, thus facilitating the user to assemble and disassemble the extending rod 20, and thereby improving assembly efficiency. Therefore, during the assembly of the extending rod 20 and the wall panel 10, the stopping portion 23 can prevent the extending rods 20 from sliding completely into the first groove structure 111 and the second groove structure 121, which causes a problem that assembly is impossible.

Alternatively, the limiting structure 30 is arranged on at least one of the first fixing rod 11 and the second fixing rod 12, and is arranged at each of sides of the first fixing rod 11 and the second fixing rod 12 facing away from the connecting plate member 14. In this embodiment, the limiting structure 30 is substantially in a bar shape. The limiting structure 30 includes a first limiting structure 31 and a second limiting structure 32. The first limiting structure 31 is arranged on the side of the first fixing rod 11 facing away from the connecting plate member 14, and the first limiting structure 31 is coupled to the first fixing rod 11. The second limiting structure 32 is arranged on the side of the second fixing rod 12 facing away from the connecting plate member 14, and the second limiting structure 32 is coupled to the second fixing rod 12. In other words, side surfaces of the first limiting structure 31 and the first fixing rod 11 facing away from the connecting plate member 14 are located at the same plane. Side surfaces of the second limiting structure 32 and the second fixing rod 12 facing away from the connecting plate member 14 are also located at the same plane. Such that the first limiting structure 31 and the first fixing rod 11 can form a complete outer wall, and the second limiting structure 32 and the second fixing rod 12 can also form a complete outer wall. Dustproof and waterproof functions of the wall panel 10 can be realized, a safety of a structure of the wall panel 10 can be further enhanced, and the overall appearance of the wall panel 10 can be improved.

In this embodiment, the guiding groove 300 includes a first guiding groove 301 and a second guiding groove 302. The first limiting structure 31 and the first groove structure 111 collectively form the first guiding groove 301. The second limiting structure 32 and the second groove structure 121 collectively form the second guiding groove 302. An orientation of the first guiding groove 301 is opposite to an orientation of the second guiding groove 302. The first guiding groove 301 is in air communication with the first groove structure 111, and the second guiding groove 302 is in air communication with the second groove structure 121. Such that, the extending rod 20 can slide along extending directions of the first guiding groove 301 and the second guiding groove 302.

Alternatively, in this embodiment, the first limiting structure 31 and the first groove structure 111 are integrally made in one piece, and the second limiting structure 32 and the second groove structure 121 are also integrally made in one piece, thereby facilitating assembly. In other embodiments, the first limiting structure 31 is detachably coupled to the first groove structure 111, and the second limiting structure 32 is also detachably coupled to the second groove structure 121. The first limiting structure 31 and the second limiting structure 32 extend along longitudinal directions of the first fixing rod 11 and the second fixing rod 12, correspondingly. Length of the first limiting structure 31 is equal to length of the first fixing rod 11, and length of the second limiting structure 32 is equal to length of the second fixing rod 12.

In this embodiment, the plurality of extending rods 20 are fixedly coupled to the corresponding first fixing rod 11 and the second fixing rod 12 by the mounting structure 40. The mounting structure 40 includes a fastening member 41. Specifically, a groove wall of one side of the first groove structure 111 adjacent to the connecting plate member 14 defines a plurality of through holes 42 for passing the fastening member 41. Each of the extending rods 20 is provided with a plurality of locking holes 43 matched with the fastening member 41 at positions corresponding to the through holes 42. The fastening member 41 can be a screw or a pin. In other embodiments, the mounting structure 40 can also be a snap or other detachable connecting structure.

It will be apprehended that, the mounting structure 40 is arranged on each of sides of the first fixing rod 11 and the second fixing rod 12 adjacent to the connecting plate member 14, that is, the mounting structure 40 is hidden within the wall panel 10, thus increasing overall appearance of the wall panel 10 and avoiding a risk that the display device is collided due to an irregular outer wall of the wall panel 10.

Figure 2:
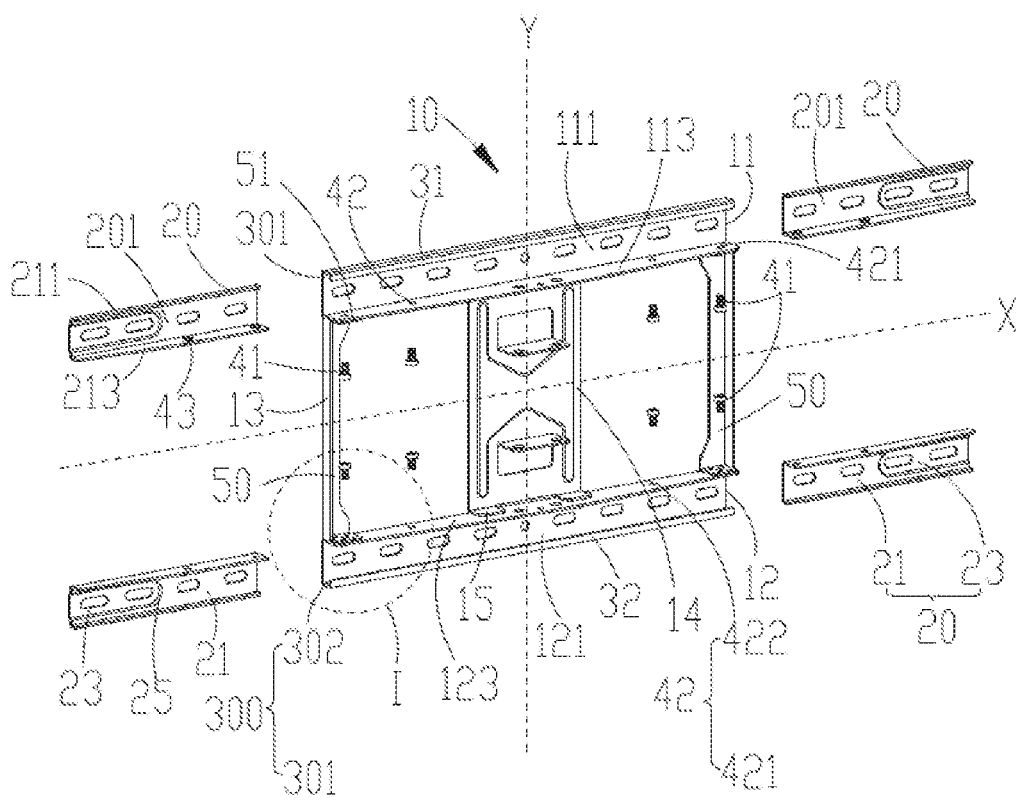
FIG. 2 is an exploded perspective view of a wall panel and a plurality of extending rods of the adjustable mounting bracket of FIG. 1.
Figure 3:
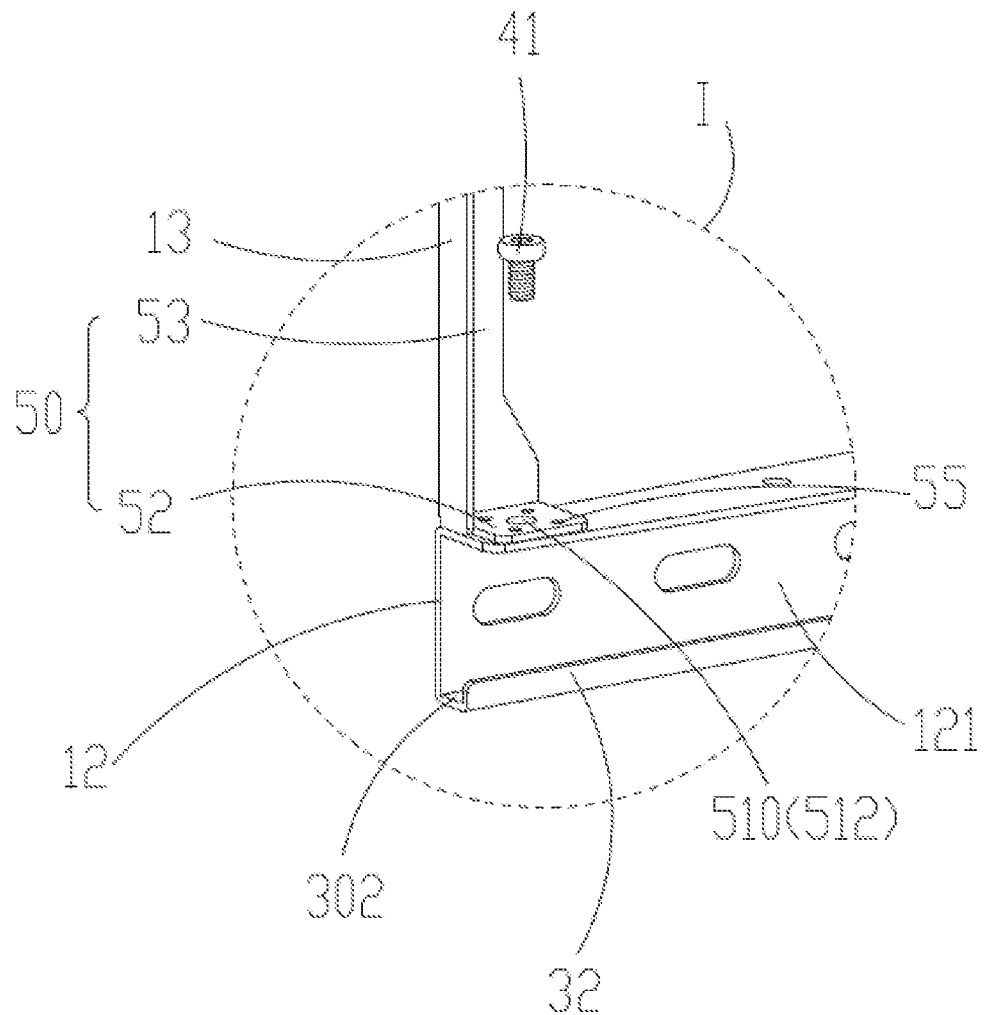
FIG. 3 is an enlarged view of a portion I of the adjustable mounting bracket of FIG. 2.

As illustrated in FIG. 2 and FIG. 3, in order to increase the stability between the extending rod 20 and the first fixing rod 11 and the second fixing rod 12 of the wall panel 10, the adjustable mounting bracket 100 further includes a reinforcing member 50. The reinforcing member 50 is located between the first fixing rod 11 and the second fixing rod 12. Two adjacent extending rods 20 are coupled by the reinforcing member 50.

Specifically, in this embodiment, the reinforcing member 50 includes two opposite holding portions 51 and a supporting portion 53 arranged between the two holding portions 51. The two holding portions 51 are respectively attached to the first fixing rod 11 and the second fixing rod 12. In an embodiment, the two holding portions 51 are fixed to the first fixing rod 11 and the second fixing rod 12 by fixing members 55. In other embodiments, the two holding portions 51 are welded to the first fixing rod 11 and the second fixing rod 12. Aligning holes 510 corresponding to the through holes 42 of the first fixing rod 11 and the second fixing rod 12 are respectively defined in middle portions of the two holding portions 51. The fastening member 41 is stopped by the holding portion 51 of the reinforcing member 50 to prevent loosening of the fastening member 41, such that the extension rod 20 is stably fixed to the wall panel 10. Specifically, an outer diameter of a head portion of the fastening member 41 is larger than an aperture of the aligning hole 510, and an outer diameter of a tail portion of the fastening member 41 is smaller than or equal to an aperture of the aligning hole 510. The tail portion of the fastening member 41 passes through the holding portion 51, and the head portion of the fastening member 41 is stopped by the holding portion 51. The mounting structure 40 sequentially passing through the aligning hole 510 of the holding portion 51 and the through hole 42 of the first fixing rod 11 or the second fixing rod 12 is locked in the locking hole 43 of corresponding extending rod 20. The supporting portion 53 is adjacent to the third fixing rod 13. The supporting portion 53 is perpendicular to the third fixing rod 13. In an embodiment, the supporting portion 53 and the third fixing rod 13 are made in one piece, thus enhancing the stability of the wall panel 10.

Alternatively, a size of the adjustable mounting bracket 100 is 24 inches, and a size of the wall panel 10 is substantially less than or equal to 16 inches. Applying to embodiment of the present disclosure, the adjustable mounting bracket 100 can meet the size requirements of the container transportation, and a size of the mounting hole of the existing wall panel may remain unchanged. The adjustable mounting bracket 100 can be applied to a display device with a larger size suitable for European and American countries, and has low cost and good stability.

It can be understood that, in some embodiments, the adjustable mounting bracket 100 further includes two telescopic and rotatable support arm structure 60, a front-rear tilting adjustment structure 70, and a display device fixation structure 80. The two telescopic and rotatable support arm structure 60 are rotatably coupled to the connecting plate member 14, and the front-rear tilting adjustment structure 70 is arranged between the two telescopic and rotatable support arm structure 60 and the display device fixation structure 80. The two telescopic and rotatable support arm structure 60 are configured to implement left and right steering of the display device to adjust a viewing angle. The front-rear tilting adjustment structure 70 is configured to implement back and forth movement of the display device to adjust a viewing distance. The display device fixation structure 80 is configured for mounting the electronic device. Therefore, the present disclosure can make the display device tilt upwards, turn left and right, and move back and forth by the mutual cooperation of the two telescopic rotating support arm structures 60 and the front-rear tilting adjustment structures 70, thus flexibility adjusting according to actual observation needs of users, and thereby improving the adaptability.

As illustrated in FIG. 1 to FIG. 3, in assembly, the first fixing rod 11 and the second fixing rod 12 are fixed to the two third fixing rods 13, and the connecting plate member 14 is welded to the first fixing rod 11 and the second fixing rod 12, thus realizing the assembly of the wall panel 10. The reinforcing members 50 are correspondingly fixed to the first fixing rod 11 and the second fixing rod 12. The connecting portions 21 of the four extending rods 20 are correspondingly inserted into the first groove structure 111 and the second groove structure 121, and the locking holes 43 on the extending rods 20 are correspondingly aligned with the through holes 42 arranged on the first groove structure 111 and the second groove structure 121 and the aligning holes 510 of the holding portion 51. The fastening members 41 are sequentially inserted into the aligning holes 510 of the holding portion 51 and the through holes 42 of the first fixing rod 11 or the second fixing rod 12 are locked in the locking holes 43 of the extending rods 20, thus realizing the assembly of the four extending rods 20 and the wall panel 10, and making the adjustable mounting bracket 100 suitable for display devices of larger sizes using in European and American countries. It will be apprehended that, the plurality of extending rods 20 are detachably coupled to the wall panel 10 during packaging, thus allowing the adjustable mounting bracket 100 to meet the size requirements of the container transportation.

An adjustable mounting bracket, which is applied for mounting a display device, is provided by the present disclosure. The adjustable mounting bracket includes a wall panel, a plurality of extending rods, and a limiting structure. The plurality of extending rods are detachably coupled to the wall panel and configured to adjusted length of the mounting bracket. The limiting structure is arranged on the wall panel. A receiving space is formed by the limiting structure and the wall panel. The plurality of extending rods are engaged with the limiting structure and received in the receiving space. The limiting structure is configured to guide the plurality of extending rods to slide in the receiving space. Since the plurality of extending rods are detachably coupled to the wall panel, the length of the mounting bracket can be adjusted by disassembling or assembling the plurality of extending rods, and the requirements of installation specifications and packaging specifications can be met simultaneously and suitable for promotion and application. In addition, since the plurality of extending rods are engaged with the limiting structure and received in the receiving space, and the limiting structure is configured to guide the plurality of extending rods to slide in the receiving space, it is easy to assemble.

The embodiments of the present disclosure are described in detail above, specific examples are used herein to describe the principle and implementation manners of the present disclosure. The description of the above embodiments is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. An adjustable mounting bracket, applied for mounting a display device, wherein the adjustable mounting bracket comprises:
   a wall panel, wherein the wall panel comprises a first fixing rod, a second fixing rod, and a connecting plate member fixedly coupled to the first fixing rod and the second fixing rod;
   a plurality of extending rods detachably coupled to the wall panel, wherein the plurality of extending rods are configured to adjust a length of the adjustable mounting bracket;
   two limiting structures arranged on the wall panel, wherein two receiving spaces are formed by the two limiting structures and the wall panel, the plurality of extending rods are engaged with the two limiting structures and received in the two receiving spaces, and the two limiting structures are configured to guide the plurality of extending rods to slide in the two receiving spaces;
   a plurality of mounting structures, wherein the plurality of extending rods are detachably coupled to at least one of the first fixing rod and the second fixing rod by the plurality of mounting structures;
   two reinforcing members, wherein each of the two reinforcing members has a non-straight configuration and is located between a lower end of the first fixing rod and an upper end of the second fixing rod, each of the two reinforcing members comprises two opposite holding portions and a supporting portion arranged between the two opposite holding portions, each of the two opposite holding portions of each of the two reinforcing members defines an aligning hole, each of the first fixing rod and the second fixing rod defines a through hole, each of the plurality of extending rods defines a locking hole, and one of the plurality of mounting structures sequentially passes through the aligning hole defined by one of the two opposite holding portions of one of the two reinforcing members and the through hole defined by one of the first fixing rod and the second fixing rod and is locked in the locking hole defined by one of the plurality of extending rods.

2. The adjustable mounting bracket of claim 1, wherein the two receiving spaces are configured as two guiding grooves formed by the two limiting structures and the wall panel, and the two guiding grooves are configured to guide the plurality of extending rods to slide along an extending direction of the two guiding grooves.

3. The adjustable mounting bracket of claim 2, wherein the two limiting structures comprise a first limiting structure and a second limiting structure, the first limiting structure is coupled to an upper end of the first fixing rod, and the second limiting structure is coupled to a lower end of the second fixing rod.

4. The adjustable mounting bracket of claim 3, wherein the two guiding grooves comprise a first guiding groove and a second guiding groove, a first groove structure and a second groove structure are formed on the first fixing rod and the second fixing rod respectively, the first limiting structure and the first groove structure collectively form the first guiding groove, and the second limiting structure and the second groove structure collectively form the second guiding groove.

5. The adjustable mounting bracket of claim 1, wherein each of the plurality of extending rods comprises a connecting portion engaged with the wall panel and having a side surface, each of the plurality of extending rods further comprises a stopping portion coupled to the respective connecting portion and having a side surface, and the side surfaces of each of the plurality of extending rods are located on different planes.

6. The adjustable mounting bracket of claim 5, wherein the stopping portion of each of the plurality of extending rods protrudes from the respective connecting portion.

7. The adjustable mounting bracket of claim 6, wherein the connecting portion of each of the plurality of extending rods is received in a respective one of the two receiving spaces, and the stopping portion of each of the plurality of extending rods is configured to be stopped by a respective one of the first fixing rod and the second fixing rod, such that the plurality of extending rods are exposed outside of the first fixing rod and the second fixing rod.

8. The adjustable mounting bracket of claim 1, wherein one of the two opposite holding portions of each of the two reinforcing members abuts the lower end of the first fixing rod, and the other of the two opposite holding portions of each of the two reinforcing members abuts the upper end of the second fixing rod.

9. The adjustable mounting bracket of claim 1, wherein one end of each of the plurality of extending rods facing away from the wall panel is configured as a free end.

10. The adjustable mounting bracket of claim 1, wherein the two opposite holding portions of each of the two reinforcing members are fixed on ends of the first and second fixing rods.

11. The adjustable mounting bracket of claim 1, wherein an extending direction of the two opposite holding portions of each of the two reinforcing members is different from an extending direction of the respective supporting portion.

12. The adjustable mounting bracket of claim 1, wherein the two opposite holding portions of each of the two reinforcing members are arranged face-to-face.

13. The adjustable mounting bracket of claim 1, wherein each of the two opposite holding portions of each of the two reinforcing members is bent relative to the respective supporting portion.

14. The adjustable mounting bracket of claim 1, wherein the wall panel further comprises a third fixing rod and a fourth fixing rod, the first fixing rod comprises a first end and a second end, the second fixing rod comprises a first end and a second end, two ends of the third fixing rod are respectively fixed on the first end of the first fixing rod and the first end of the second fixing rod, and two ends of the fourth fixing rod are respectively fixed on the second end of the first fixing rod and the second end of the second fixing rod.

15. The adjustable mounting bracket of claim 14, wherein the first fixing rod, the second fixing rod, the third fixing rod and the fourth fixing rod constitute the wall panel in the form of a rectangular frame.

16. The adjustable mounting bracket of claim 14, wherein the supporting portion of each of the two reinforcing members abuts a respective one of the third fixing rod and the fourth fixing rod.

17. The adjustable mounting bracket of claim 14, wherein an extending direction of the supporting portion of each of the two reinforcing members is the same as an extending direction of the third fixing rod and an extending direction of the fourth fixing rod, and an extending direction of the two opposite holding portions of each of the two reinforcing members is different from the extending direction of the third fixing rod and the extending direction of the fourth fixing rod.

18. The adjustable mounting bracket of claim 14, wherein the supporting portion of one of the two reinforcing members and the third fixing rod are made in one piece, and the supporting portion of another of the two reinforcing members and the fourth fixing rod are made in one piece.

* * * * *